US008316263B1

(12) United States Patent
Gough et al.

(10) Patent No.: US 8,316,263 B1
(45) Date of Patent: *Nov. 20, 2012

(54) PREDICTING DISK DRIVE FAILURE AT A CENTRAL PROCESSING FACILITY USING AN EVOLVING DISK DRIVE FAILURE PREDICTION ALGORITHM

(75) Inventors: Ross E. Gough, Foothill Ranch, CA (US); Steven Neal Rivkin, Laguna Niguel, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1449 days.

This patent is subject to a terminal disclaimer.

(21) Appl. No.: 10/983,982

(22) Filed: Nov. 8, 2004

(51) Int. Cl.
G06F 11/00 (2006.01)

(52) U.S. Cl. .......................................... 714/47.3; 706/21
(58) Field of Classification Search .................... 714/47, 714/47.3; 706/21
See application file for complete search history.

(56) References Cited

U.S. PATENT DOCUMENTS

| 5,737,519 | A | 4/1998 | Abdelnour et al. |
| 6,408,406 | B1 | 6/2002 | Parris |
| 6,460,151 | B1 * | 10/2002 | Warwick et al. ............... 714/718 |
| 6,467,153 | B2 | 10/2002 | Butts et al. |
| 6,550,021 | B1 | 4/2003 | Dalphy et al. |
| 6,574,754 | B1 | 6/2003 | Smith |
| 6,601,053 | B1 | 7/2003 | Schaffer et al. |
| 6,651,192 | B1 | 11/2003 | Viglione et al. |
| 6,948,102 | B2 * | 9/2005 | Smith .............................. 714/47 |
| 6,978,398 | B2 * | 12/2005 | Harper et al. .................... 714/13 |
| 6,982,842 | B2 * | 1/2006 | Jing et al. ......................... 360/31 |
| 7,120,832 | B2 * | 10/2006 | Collins et al. ................... 714/42 |
| 7,236,911 | B1 * | 6/2007 | Gough et al. ................. 702/185 |
| 2001/0034628 | A1 * | 10/2001 | Eder .................................. 705/7 |
| 2002/0053046 | A1 | 5/2002 | Gray et al. |
| 2003/0218818 | A1 | 11/2003 | Bement et al. |
| 2004/0044633 | A1 | 3/2004 | Chen |

OTHER PUBLICATIONS

C. Apte, S.M. Weiss, G. Grout, "Predicting Defects in Disk Drive Manufacturing: A Case Study in High-Dimensional Classification", IEEE Annual Conference on AI Applications, CAIA-93, Mar. 1993.
Bernhard Omer, "Genetic Algorithms for Neural Network Training on Transputers" Department of Computing Science, University of Newcastle upon Tyne, pp. 1-100, May 24, 1995.
G. F. Hughes, J. F. Murray, K. Kreutz-Delgado, C. Elkan, "Improved Disk Drive Failure Warnings", IEEE Transactions on Reliability, pp. 1-10, Sep. 2002.

* cited by examiner

*Primary Examiner* — Christopher McCarthy

(57) ABSTRACT

A method of predicting disk drive failure at a central processing facility using an evolving drive failure prediction algorithm (DFPA) is disclosed. A set of quality metric values are transmitted from each of a plurality of remote disk drives to the central processing facility. The DFPA is executed at the central processing facility in response to the quality metric values to detect an impending failure of at least one of the remote disk drives. The DFPA is evolved at the central processing facility in response to a reference data base of quality metric values and a corresponding failure indicator. The processes is repeated so as to improve the accuracy of the DFPA over time.

14 Claims, 11 Drawing Sheets

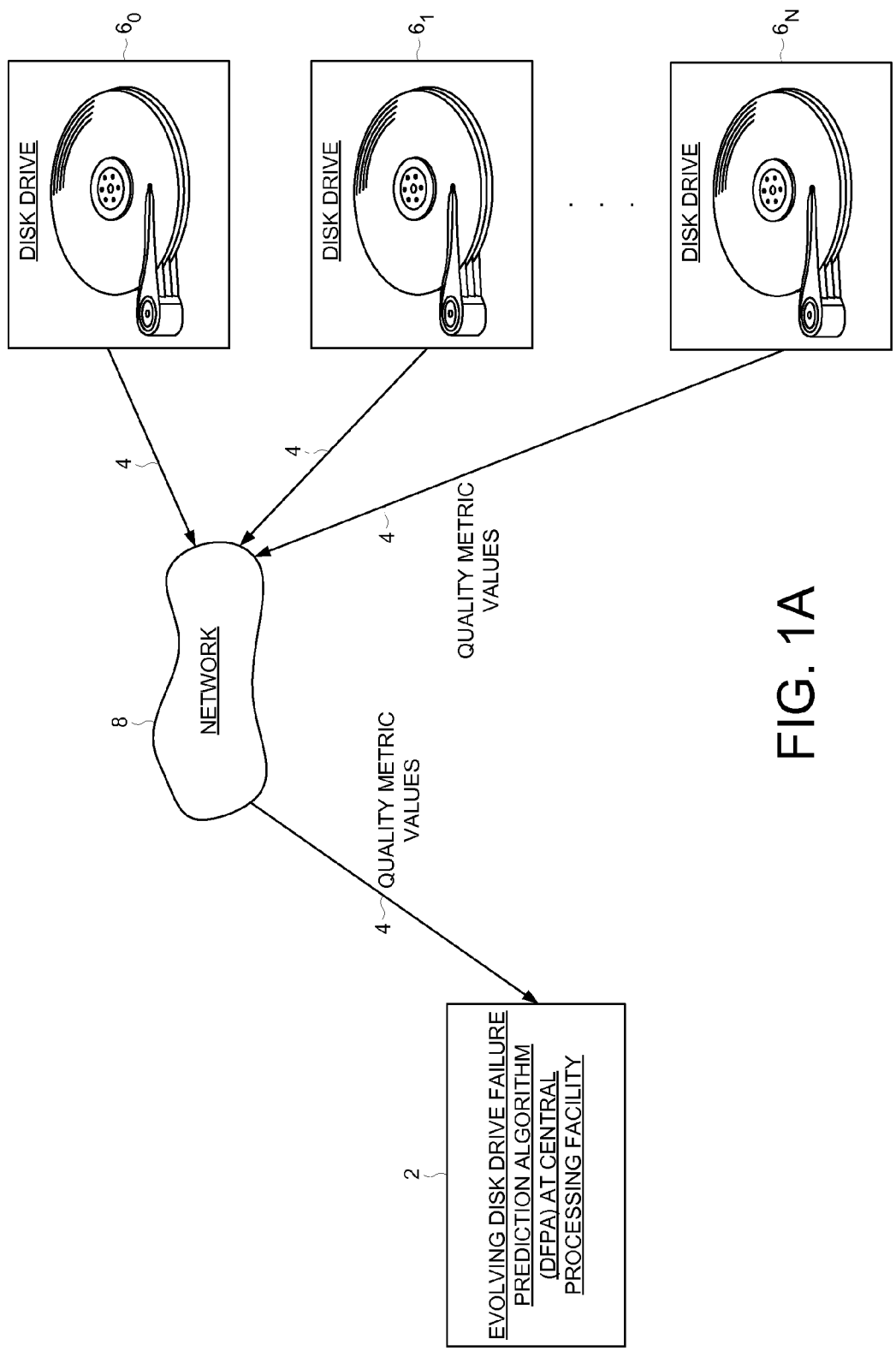

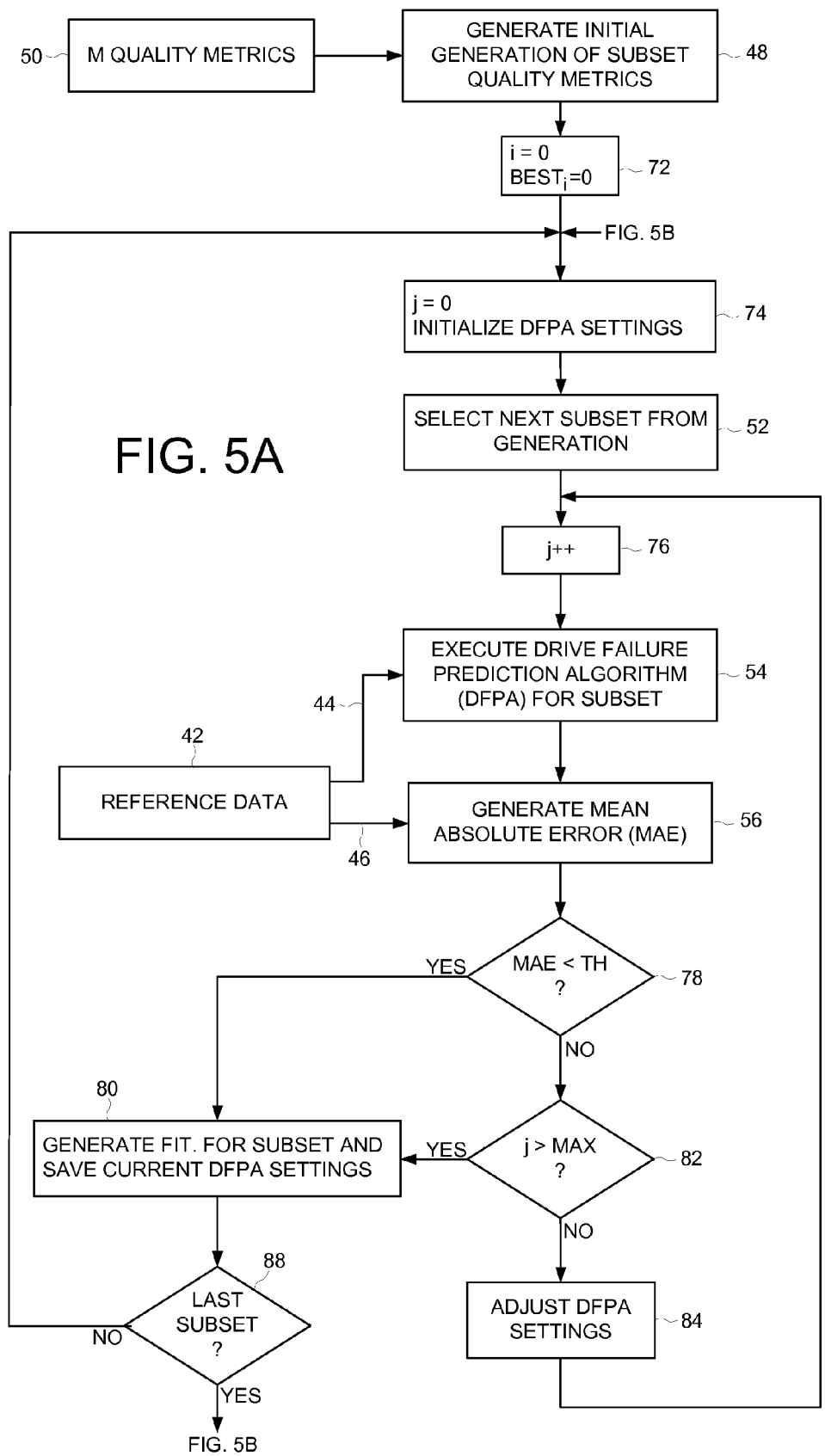

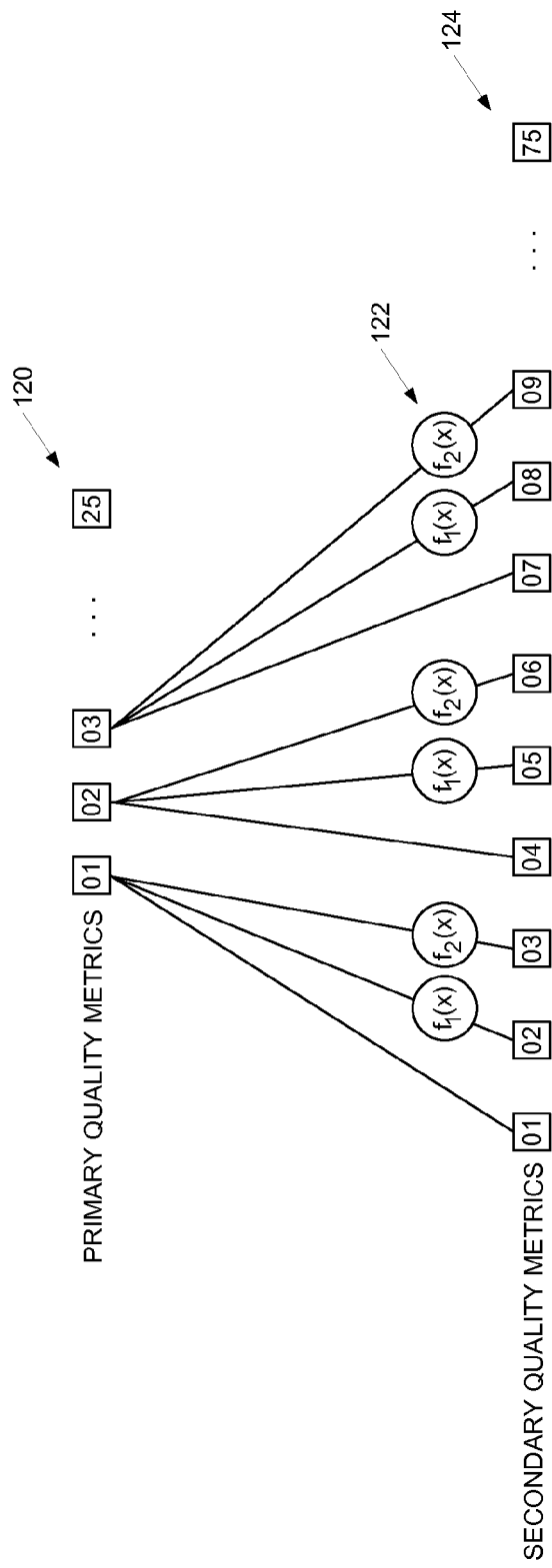

US 8,316,263 B1

PREDICTING DISK DRIVE FAILURE AT A CENTRAL PROCESSING FACILITY USING AN EVOLVING DISK DRIVE FAILURE PREDICTION ALGORITHM

BACKGROUND OF THE INVENTION

1. Field of the Invention

The present invention relates to failure prediction for disk drives. In particular, the present invention relates to predicting failure of remote disk drives at a central processing facility using an evolving disk drive failure prediction algorithm.

2. Description of the Prior Art

Predicting impending failure of disk drives deployed in-the-field helps protect against catastrophic data loss, for example, by suggesting an end user back-up and/or replace the failing disk drive. Another application of disk drive failure prediction is preemptive maintenance of consumer electronics devices that utilize disk drives, such as personal digital assistants (PDAs), digital cameras, personal video recorders (PVRs), and the like. For example, if the failure prediction algorithm indicates impending failure, the end user may return the consumer electronic device to the vendor for repair or replacement.

In the past, failure prediction algorithms have been implemented within each disk drive wherein the disk drive itself issues a warning when failure is imminent. An example of a failure prediction algorithm implemented within a disk drive is the Self-Monitoring Analysis and Reporting Technology (SMART), which monitors a number of quality metric values (e.g., fly-height), and reports an impending failure if any one of the quality metric values exceeds some predetermined threshold. A problem with internally implemented failure prediction algorithms, such as SMART, is their limited degree of sophistication which increases the likelihood that impending failures are not detected leading to catastrophic data loss, or that impending failures are falsely detected (false alarm) leading to unnecessary and costly remedial action.

There is, therefore, a need to improve upon disk drive failure prediction so as to increase the failure prediction accuracy while minimizing the number of false alarms.

SUMMARY OF THE INVENTION

The present invention may be regarded as a method of predicting disk drive failure at a central processing facility using an evolving drive failure prediction algorithm (DFPA). A set of quality metric values are transmitted from each of a plurality of remote disk drives to the central processing facility. The DFPA is executed at the central processing facility in response to the quality metric values to detect an impending failure of at least one of the remote disk drives. The DFPA is evolved at the central processing facility in response to a reference data base of quality metric values and a corresponding failure indicator. The processes is repeated so as to improve the accuracy of the DFPA over time.

In one embodiment, the reference data base comprises quality metric values transmitted to the central processing facility from at least one of the remote disk drives. In another embodiment, the reference data base comprises a failure indicator transmitted to the central processing facility from a remote location. In yet another embodiment, the failure indicator is transmitted to the central processing facility from a remote component device comprising one of the remote disk drives. In still another embodiment, the reference data base comprises quality metric values and a corresponding failure indicator generated during a disk drive manufacturing process.

In another embodiment, the step of evolving the DFPA comprises the step of adjusting at least one setting of the DFPA. In one embodiment, the DFPA comprises a neural network comprising a plurality of processing elements, each processing element comprises a plurality of weights, and the at least one DFPA setting comprises at least one weight.

In yet another embodiment, the step of executing the DFPA comprises the step of processing a subset of the quality metric values. In one embodiment, the step of evolving the DFPA comprises the step of modifying the subset of the quality metric values, and in one embodiment, at least one genetic operator is used to modify the subset of the quality metric values. In one embodiment, the genetic operator is selected from the group consisting of a crossover operator, a mutation operator, and a replication operator.

BRIEF DESCRIPTION OF THE DRAWINGS

FIG. 1A shows an embodiment of the present invention wherein a central processing facility uses an evolving disk drive failure prediction algorithm to predict failure of remote disk drives from quality metric values received from the disk drives over a network.

FIGS. 5A-5B show a flow diagram according to an embodiment of the present invention wherein a number of iterations are performed to adjust the DFPA settings for each subset in a generation, and a number of iterations are performed to evolve the subsets using the genetic algorithm.

FIG. 7A shows an embodiment of the present invention wherein the plurality of quality metrics is generated by computing secondary quality metrics from primary quality metrics according to a first and second predetermined functions.

FIG. 7B illustrates that in one embodiment the first and second predetermined functions are the logarithm base 10 and hyperbolic tangent functions.

DESCRIPTION OF THE PREFERRED EMBODIMENTS

FIG. 1A shows a technique according to an embodiment of the present invention for predicting disk drive failure at a central processing facility 2 using an evolving drive failure prediction algorithm (DFPA). A set of quality metric values 4 are transmitted from each of a plurality of remote disk drives $6_0$-$6_N$ to the central processing facility 2. The DFPA is executed at the central processing facility 2 in response to the quality metric values 4 to detect an impending failure of at least one of the remote disk drives $6_0$-$6_N$. The DFPA is evolved at the central processing facility 2 in response to a reference data base of quality metric values and a corresponding failure indicator. The process is repeated so as to improve the accuracy of the DFPA over time.

Any suitable quality metrics 4 may be employed in the embodiments of the present invention. Example quality metrics may include head/disk interface characteristics (e.g., head fly height measurement, thermal asperity detection, etc.), read channel settings (e.g., gain control, timing recovery, equalizer settings, etc), error correction parameters (e.g., number of retries, on-the-fly ECC errors, off-line error correction, etc.), servo control parameters (e.g., seeking errors, tracking errors, etc.), and the like.

Figure 1B:
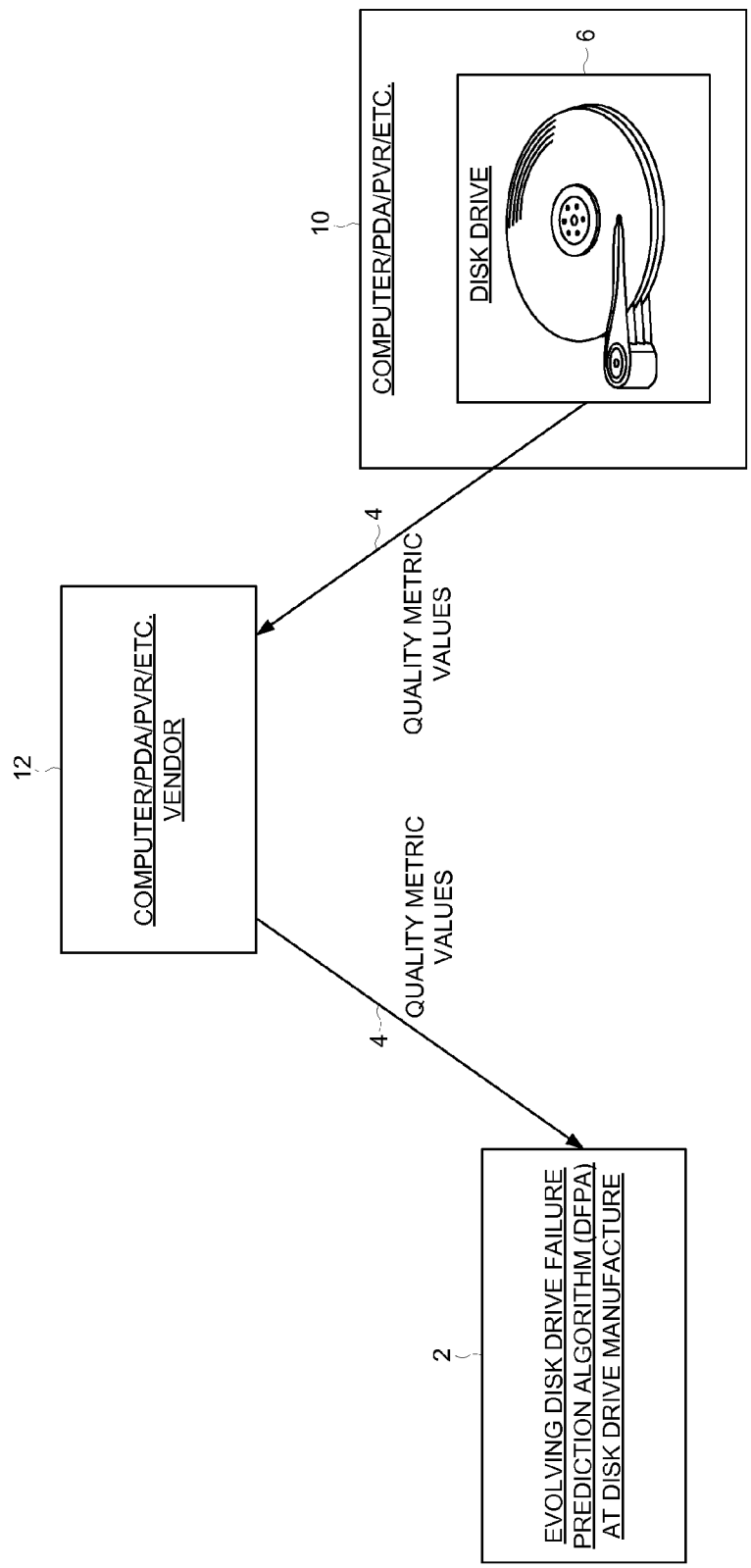
FIG. 1B shows an embodiment of the present invention wherein the central processing facility is a disk drive manufacturer, and the quality metric values are transmitted from a component vendor.

In the embodiment of FIG. 1A, the quality metric values 4 are transmitted to the central processing facility 2 using a network 8, such as the Internet. The disk drives $6_0$-$6_N$ may be connected directly to the network 8, for example, as network attached storage devices. In an alternative embodiment shown in FIG. 1B, the disk drive 6 is an integrated part of a component device 10, such as a personal computer, personal digital assistant, personal video recorder, digital camera, and the like. Also in the embodiment of FIG. 1B, the quality metric values 4 are transmitted to the component vendor 12 (e.g., via the Internet), and the component vendor 12 forwards the quality metric values 4 to the central processing facility 2, such as a disk drive manufacturer. If the DFPA executed at the disk drive manufacturer 2 detects an imminent drive failure, the disk drive manufacturer notifies the component vendor 12 to take remedial action, such as replacing the disk drive 6 or the entire component device 10.

Figure 2:
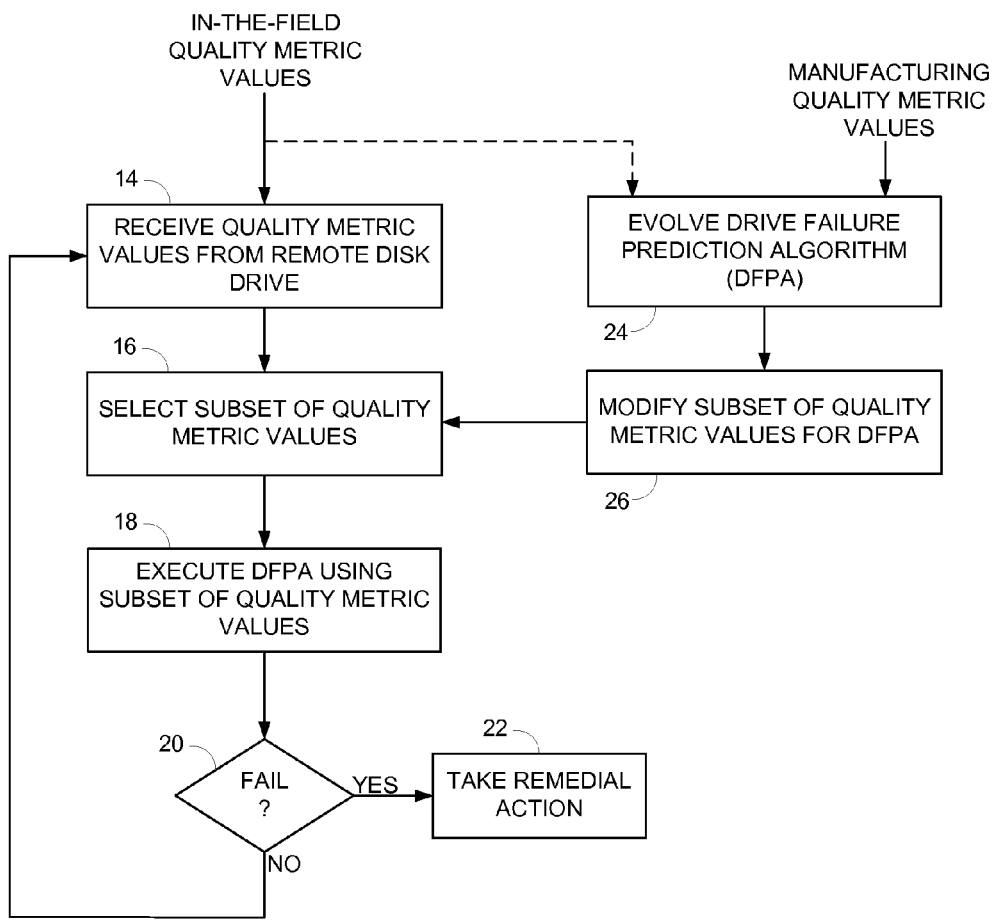
FIG. 2 is a flow diagram according to an embodiment of the present invention wherein in-the-field quality metric values as well as manufacturing quality metric values are used to evolve the failure prediction algorithm at the central processing facility.

FIG. 2 is a flow diagram according to an embodiment of the present invention illustrating the processes executed at the central processing facility 2. At step 14 the central processing facility 2 receives the quality metric values 4 from a remote disk drive 6. At step 16 a subset of the quality metric values are selected, and at step 18 the DFPA is executed on the subset of quality metric values. If at step 20 the DFPA detects an impending failure of the remote disk drive, at step 22 the central processing facility 2 takes remedial action, such as transmitting a notification to repair or replace the disk drive. At step 24 the central processing facility 2 evolves the DFPA in response to a reference data base of quality metric values and a corresponding failure indicator. In one embodiment, the quality metric values are those received from the remote disk drives and/or quality metric values generated as part of the disk drive manufacturing process. In the embodiment of FIG. 2, the evolution of the DFPA means modifying the subset of quality metric values at step 26, thereby changing the subset of quality metrics selected at step 16.

Figure 3:
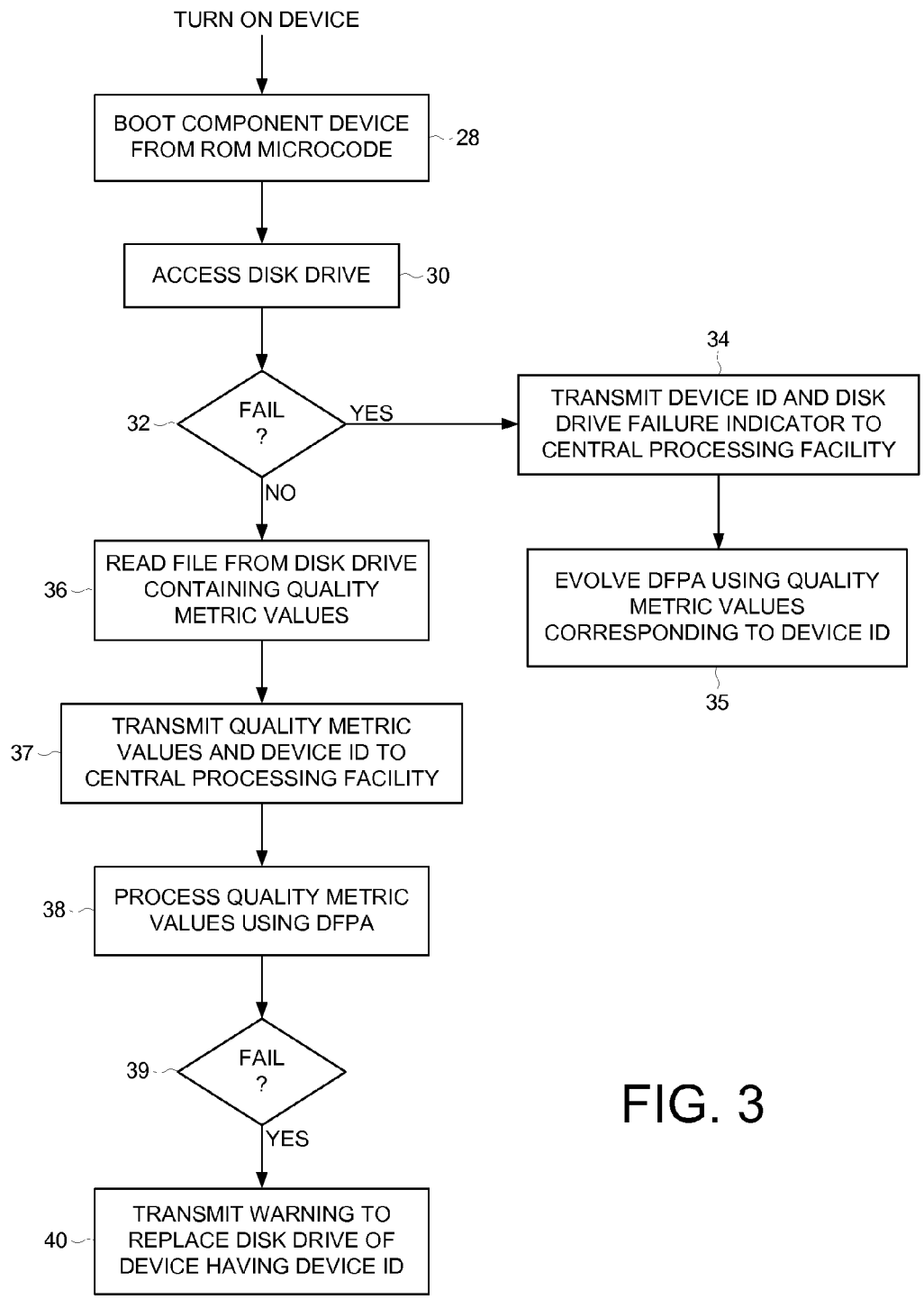
FIG. 3 is a flow diagram according to an embodiment of the present invention wherein a disk drive failure indicator is transmitted from an in-the-field component device comprising a failed disk drive.

The failure indicators in the reference data base used to evolve the DFPA at step 24 of FIG. 2 may be generated as part of the manufacturing process, or received from a remote component device comprising a failed disk drive as illustrated in the flow diagram of FIG. 3. At step 28, the component device is booted from micro-code stored in a non-volatile semiconductor memory, such as an EEPROM. At step 30, the component device attempts to access its internal disk drive and if at step 32 the attempt fails, then at step 34 the component device transmits a device ID and a disk drive failure indicator to the central processing facility 2. At step 35 the central processing facility 2 evolves the DFPA using the quality metric values that were transmitted previously by the component device and identified by the device ID.

If at step 32 of FIG. 3 the component device is able to access its internal disk drive, then at step 36 the component device reads a file from the disk drive containing the quality metric values and at step 37 transmits the quality metric values together with a device ID to the central processing facility 2. At step 38 the central processing facility executes the DFPA in response to the quality metric values, and if an impending failure is detected at step 39, transmits a failure notification at step 40 to the component device having the corresponding device ID. In an alternative embodiment, when a remote disk drive fails within a component device the entire disk drive is transported to the central processing facility 2 where it is identified and the corresponding quality metric values used to evolve the DFPA at step 24 of FIG. 2. The quality metric values may have been transmitted previously by the disk drive before failing, or the disk drive may be repaired and the quality metric values retrieved from the repaired disk drive for use in evolving the DFPA.

Figure 4:
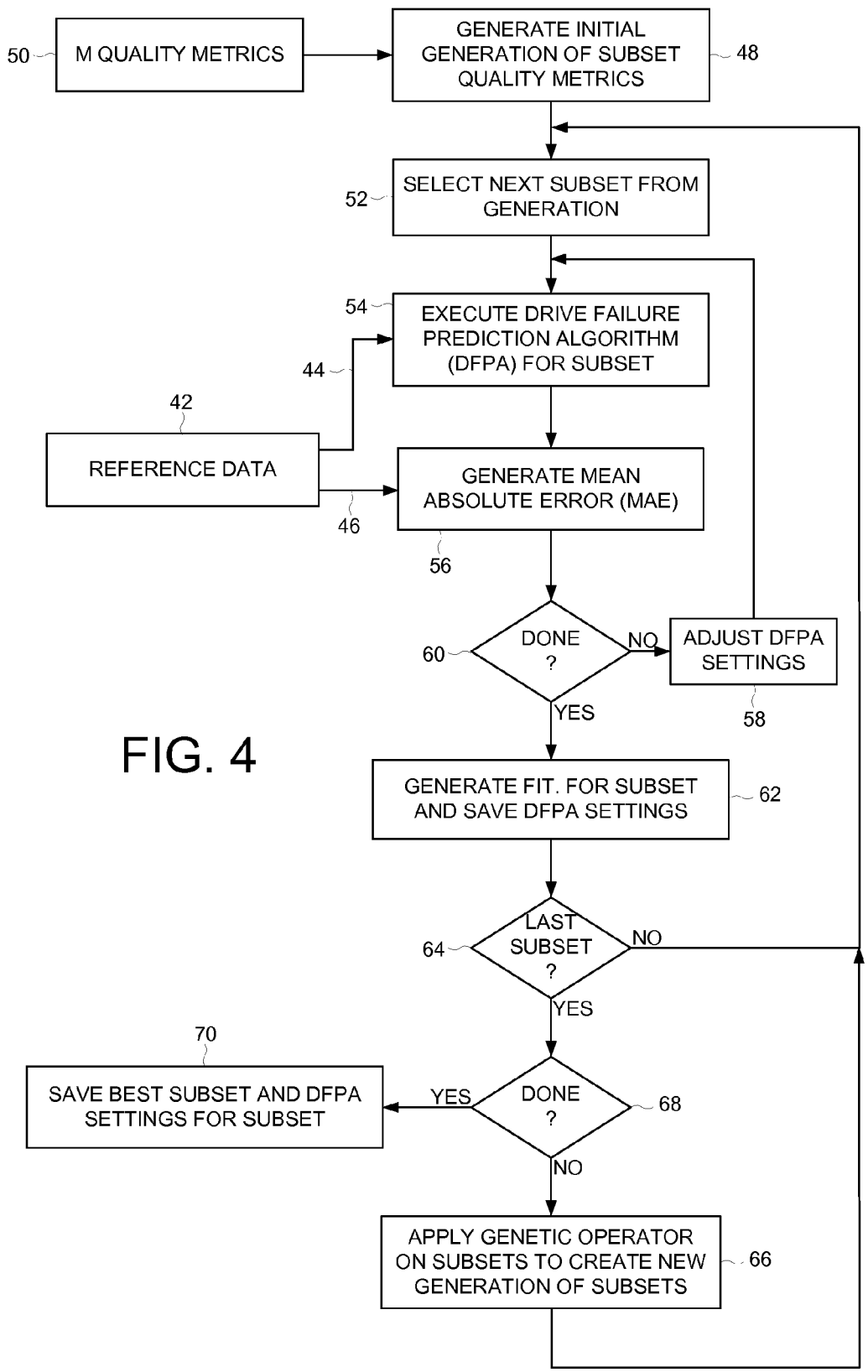
FIG. 4 is a flow diagram according to an embodiment of the present invention wherein an adaptive drive failure prediction algorithm (DFPA) and a genetic algorithm are used to identify a subset of quality metrics and corresponding DFPA settings that are the best indicators of drive failure.

FIG. 4 is a flow diagram illustrating an embodiment of the present invention wherein a genetic algorithm is used to select a subset of quality metrics that are the best indicators of drive failure. At step 42, a reference data base of quality metric values 44 and a corresponding failure indicator 46 is generated for a subset of disk drives out of a family of disk drives. The reference data base may be generated, for example, by evaluating the subset of disk drives using a manufacturing test that identifies failed disk drives as well as the corresponding quality metrics. At step 48 an initial generation of subset quality metrics is selected from a group of M quality metrics 50, wherein each subset comprises N<M quality metrics and each quality metric can take on one of a number of quality metric values representing a quality of a disk drive. At step 52 a subset of quality metrics is selected from the generation, and at step 54 a drive failure prediction algorithm (DFPA) is executed for the selected subset using the quality metric values 44 stored in the reference data base 42. At step 56 a mean absolute error (MAE) is generated for the selected subset, wherein the MAE represents an accuracy of the drive failure prediction algorithm relative to the failure indicators 46 stored in the reference data base 42. At step 58, at least one setting of the DFPA is adjusted and the flow diagram starting at step 54 is repeated until a predetermined criteria is satisfied at step 60. Any suitable DFPA may be employed, and in an embodiment described below, the DFPA comprises a neural network wherein the weights of the processing elements in the neural network are adjusted at step 58.

At step 62 a fitness score is generated for the selected subset in response to the current MAE, and the corresponding DFPA settings are saved. If at step 64 there are more subsets to evaluate, the flow diagram is repeated starting at step 52 by selecting another subset from the generation. Once a fitness score has been generated for each subset, at step 66 at least one genetic operator is applied to the subsets in response to the fitness scores to generate a new generation of subsets, wherein the genetic operator is selected from the group consisting of a crossover operator, a mutation operator, and a replication operator. The flow diagram is then repeated starting at step 52 until a predetermined criteria is satisfied at step 68. At step 70 the subset of quality metrics that generated the best fitness score and the corresponding DFPA settings for the subset are saved. The saved subset of quality metrics and DFPA settings are then used in the DFPA to predict failure of disk drives in a manufacturing line or while in the field.

A genetic algorithm attempts to find a global maximum (best solution or best fitness score) to a problem using Darwinian-type survival of the fittest type strategy whereby potential solutions to the problem compete and "mate" with each other in order to produce increasingly better solutions. In the context of finding the subset of quality metrics that are the best indicators of drive failure, each subset of quality metrics can be considered as a chromosome wherein the quality metrics represents the gene pool for the chromosomes. Comparing the output of the DFPA (step 56 of FIG. 4) to the failure indicators 46 in the reference data base 42 is the means for measuring the fitness for each chromosome of quality metrics. The genetic operators are then applied to the chromosomes having the highest fitness score (at step 66) to generate a new set of chromosomes that eventually "evolve" toward the optimal solution.

Figure 5B:
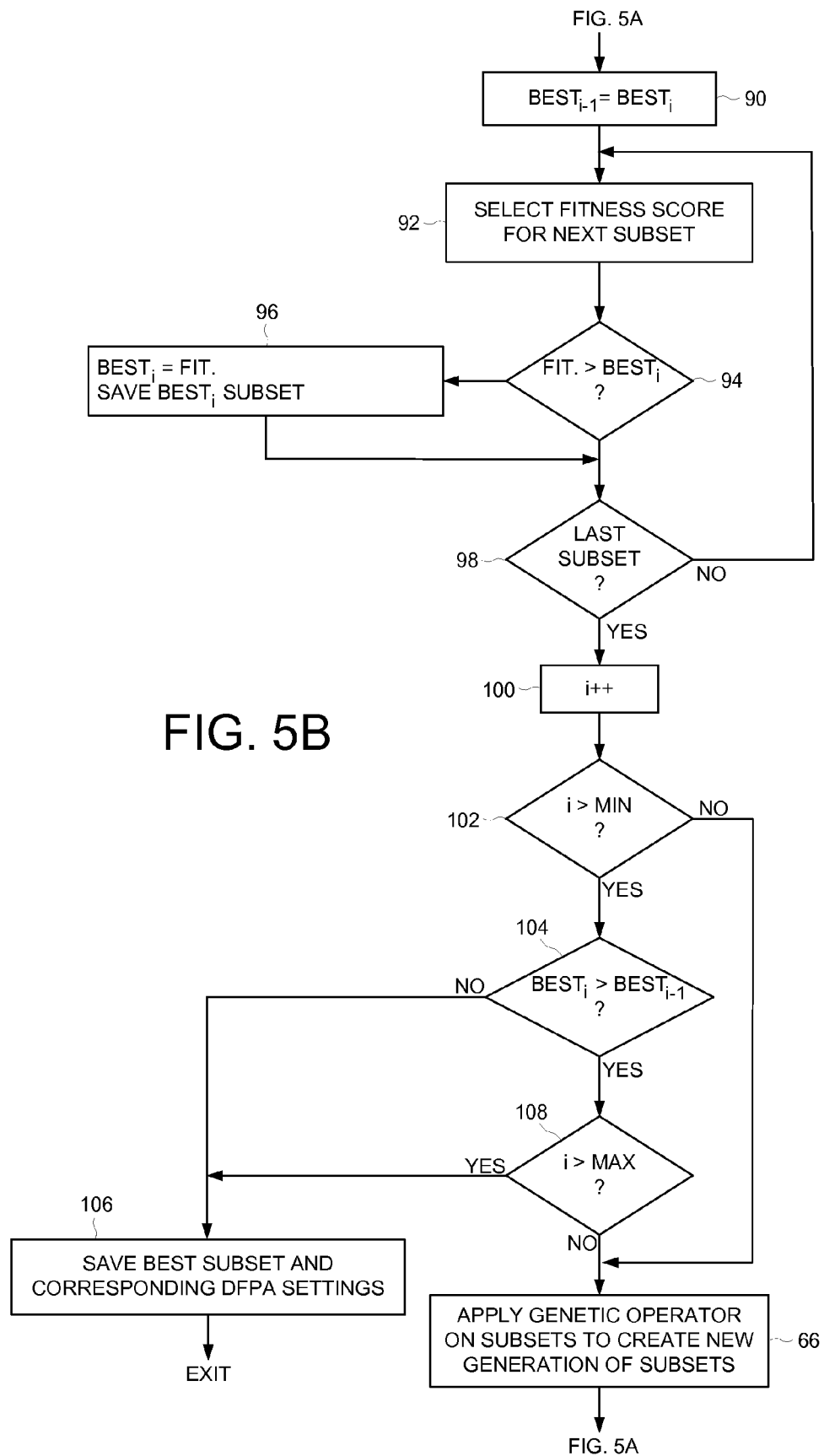

FIGS. 5A-5B show a flow diagram according to an embodiment of the present invention wherein FIG. 5A shows a number of iterations are performed to adjust the DFPA settings for each subset in a generation until the MAE falls below a threshold or a maximum number of iterations are reached. FIG. 5B shows a minimum number of iterations are performed to evolve the subsets using the genetic algorithm. If after executing the minimum number of iterations the fitness score is not trending upward toward a new maximum, the genetic algorithm terminates. The genetic algorithm may also terminate if a maximum number of iterations is reached. Referring to FIG. 5A, at step 72 an iteration counter i and a variable BEST, are initialized to zero, wherein the iteration counter i counts the number of iterations for the genetic algorithm, and the variable BEST; stores the best fitness score out of the subset of quality metrics in the current generation. At step 74 an iteration counter j is initialized to zero, wherein the iteration counter j counts the number of iterations for training the DFPA. The DFPA settings are also initialized at step 74 (e.g., setting the weights of a neural network to default values). At step 52 a subset of quality metric is selected from the current generation, and at step 76 the iteration counter j is incremented. At step 54 the DFPA algorithm is executed for the selected subset, and a corresponding MAE generated at step 56. If at step 78 the MAE is not less than a threshold and at step 82 the iteration counter j is less than a maximum, then at step 84 at least one DFPA setting is adjusted and the flow diagram is repeated starting at step 76. If at step 78 the MAE is less than the threshold, or at step 82 the iteration counter j is greater than the maximum, then at step 80 a fitness score is generated for the current subset in response to the MAE, and the current DFPA settings are saved. The flow diagram of FIG. 5A is repeated until at step 88 a fitness score and DFPA settings have been saved for each subset in the current generation, wherein flow control transfers to FIG. 5B.

At step 90 of FIG. 5B the current BEST, fitness score is saved into a variable $BEST_{i-1}$. At step 92 the best fitness score for a subset in the generation (saved at step 80 of FIG. 5A) is selected and compared at step 94 to $BEST_i$. If the fitness score is greater than $BEST_i$, then at step 96 the fitness score is assigned to $BEST_i$, and the selected subset is saved. If at step 98 there are more subsets to evaluate, then the flow diagram repeats starting with step 92. Once the best fitness score for each subset has been evaluated, at step 100 the iterations counter i is incremented. If at step 102 the number of genetic evolution iterations does not exceed a minimum, then at step 66 at least one genetic operator is applied to the subsets in response to the best fitness scores for the current subsets to generate a new generation of subsets and control transfers to step 74 of FIG. 5A to perform DFPA training on the new generation of subsets. If at step 102 the number of genetic evolution iterations exceeds the minimum, and at step 104 the current BEST, variable is not greater than the previous iteration $BEST_{i-1}$ (saved at step 90), it indicates that the fitness score is not trending toward a new maximum and the genetic algorithm therefore terminates at step 106 after saving the subset and corresponding DFPA settings that generated the best overall fitness score. The genetic algorithm also terminates at step 106 if at step 108 the number of genetic evolution iterations has exceeded a maximum.

Figure 6:
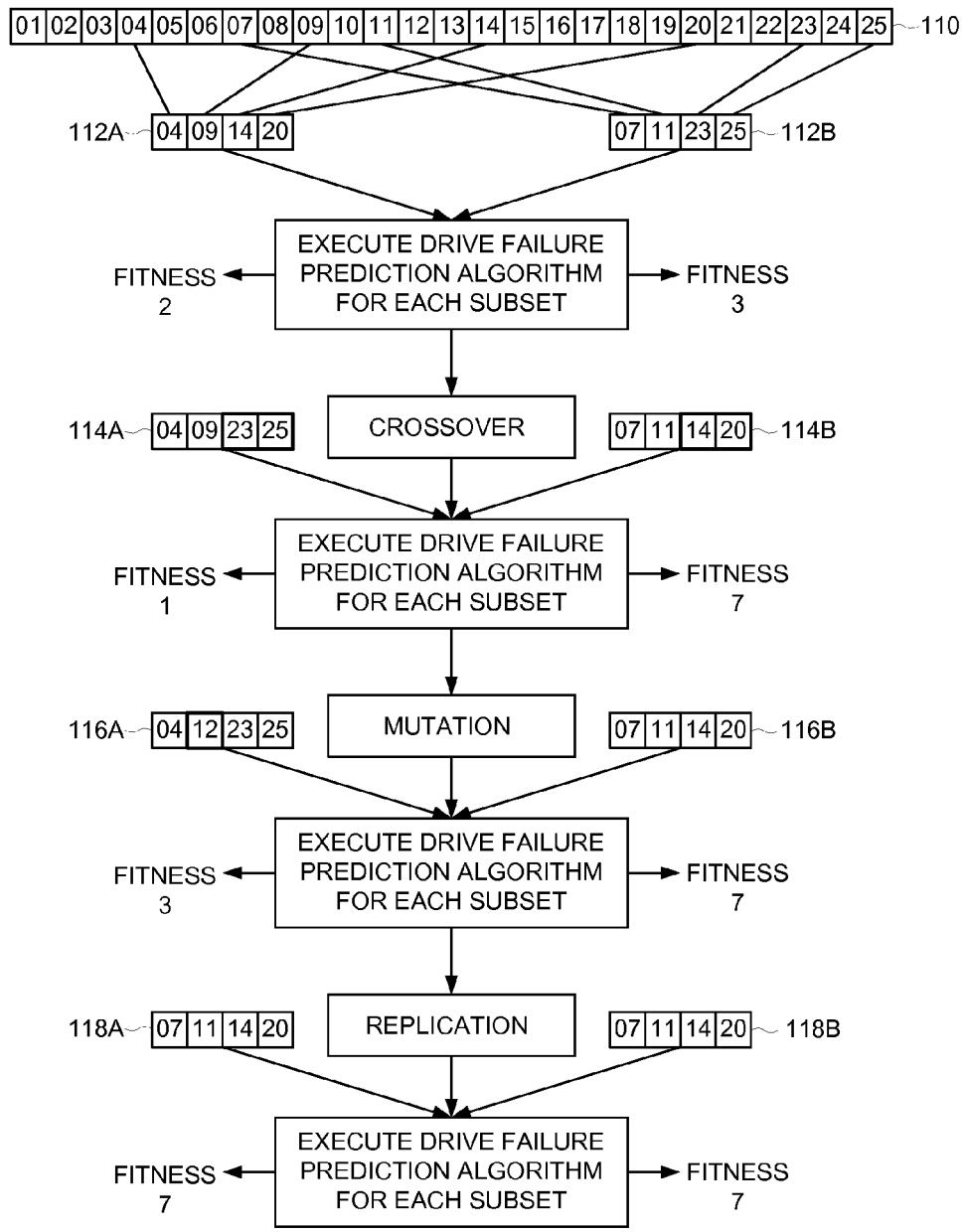
FIG. 6 illustrates an embodiment of the present invention wherein a plurality of genetic operators employed by the genetic algorithm includes crossover, mutation, and replication.

The process of genetic evolution is illustrated in FIG. 6 wherein an initial generation of quality metric subsets (chromosomes) are selected from an available pool of 25 quality metrics 110 numbered 1-25. In this example, two subsets 112A and 112B of four quality metrics are generated by randomly selecting four quality metrics from the pool 110. The first subset 112A comprises quality metrics {04, 09, 14, 20} and the second subset 112B comprises quality metrics {07, 11, 23, 25}. Any suitable number of subsets of any suitable length may be generated to create the initial generation of subsets; the example of FIG. 6 uses two subsets of length four for the purpose of illustration. The DFPA is executed to generate a fitness score for each subset. The crossover operator is then applied to the subsets 112A and 112B to generate a new generation of subsets 114A and 114B. In this example, the crossover operator is performed on the last two quality metrics of subsets 112A and 112B, that is, quality metrics {14, 20} of subset 112A are crossed over with quality metrics {23, 25} of subset 112B. The DFPA is then executed to generate a fitness score for each of the new generation of subsets 114A and 114B. The mutation operator is then applied to the subsets 114A and 114B to generate a new generation of subsets 116A and 116B. In this example, the mutation operator mutates the second quality metric in subset 114A, that is, quality metric {09} in subset 114A is mutated to {12}. The DFPA is again executed to generate a fitness score for each of the new generation of subsets 116A and 116B. The replication operator is then applied to the subsets 116A and 116B to generate a new generation of subsets 118A and 118B. In this example, the replication operator replicates the second subset 116B as the first subset 118B. The drive failure prediction algorithm is again executed to generate a fitness score for each of the new generation of subsets 118A and 118B.

FIG. 7A shows an embodiment of the present invention wherein the group of M quality metrics 50 (FIG. 4) comprises a primary set of quality metrics 120 and at least one predetermined function 122 operating on the primary set of quality metrics 120 to generate a secondary set of quality metrics 124. In an embodiment shown in FIG. 7B, the predetermined function 122 comprises a logarithm base 10 function and a hyperbolic tangent function. Thus in FIG. 7A there are 25 quality metrics in the primary set 120 and 75 quality metrics in the secondary set 124 after applying the logarithm base 10 function and a hyperbolic tangent function on the primary set 120.

Figures 8A, 8B:
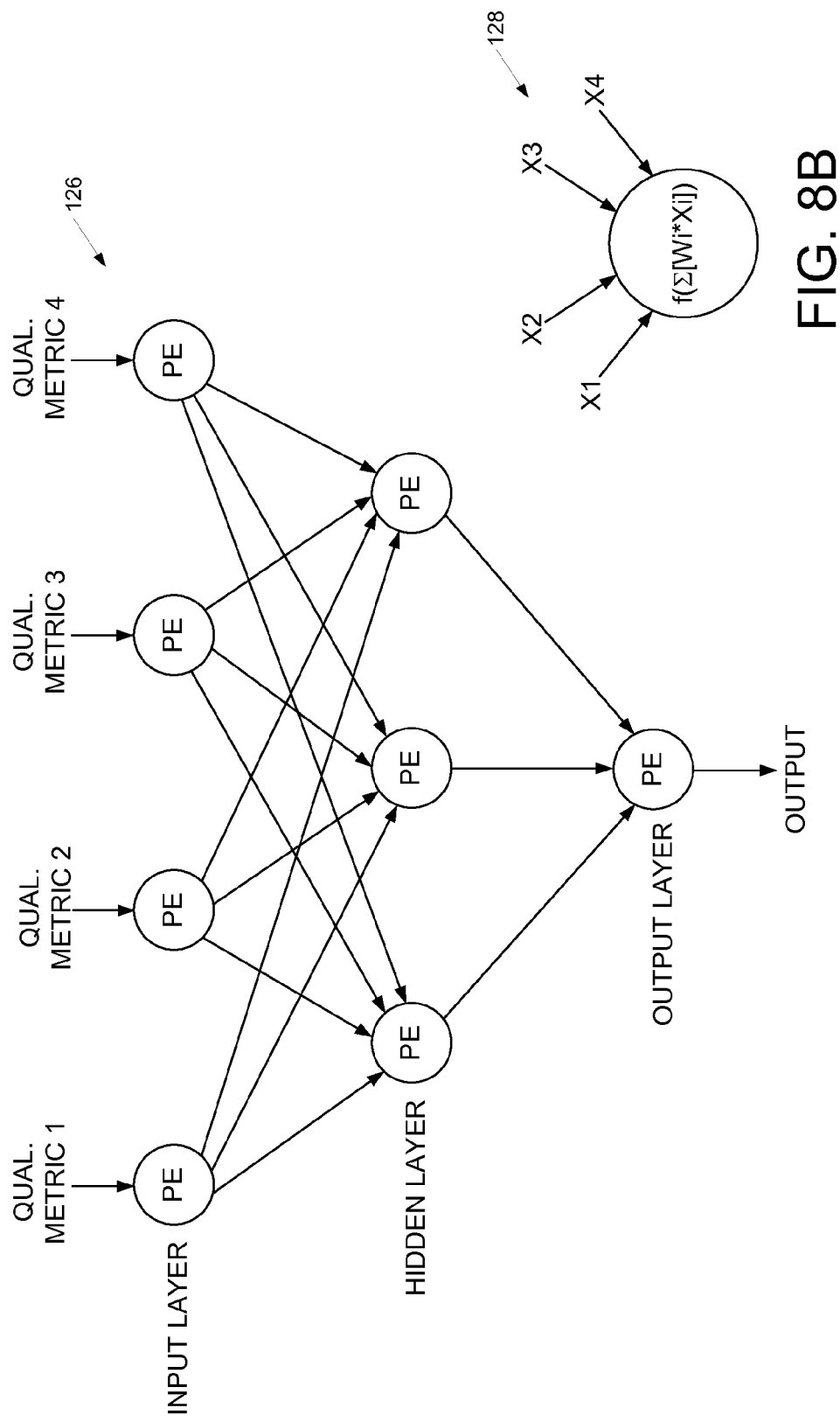
FIG. 8A shows an embodiment of the present invention wherein the drive failure prediction algorithm employs a neural network comprising a plurality of processing elements.
FIG. 8B shows an embodiment of each processing element in the neural network.

Any suitable DFPA may be employed in the embodiments of the present invention. FIG. 8A shows an embodiment wherein the DFPA employs a neural network 126 comprising an input layer, a hidden layer, and an output layer. Each layer comprises a number of processing elements (PE), which are interconnected between the layers to form a directed graph. Each PE implements any suitable function on the inputs. FIG. 8B shows an embodiment of a PE 128 wherein the function is simply the summation of the inputs Xi scaled by a respective weight Wi. In one embodiment the neural network is optimized (step 58 of FIG. 4) by adapting (i.e., training) the weights Wi to improve the accuracy of the DFPA as determined from the reference data base 42 of quality metric values and corresponding failure indicators 46. The output of the neural network is a composite score representing the propensity of drive failure based on the combined influence of multiple quality metrics (four in the embodiments shown). The output of the neural network is evaluated at step 56 of FIG. 4 to generate the fitness score used by the genetic algorithm to select the subset of quality metrics that are the best indicators of drive failure. The output of the neural network may also be used to predict drive failure during manufacturing or while in-the-field.

Figure 9:
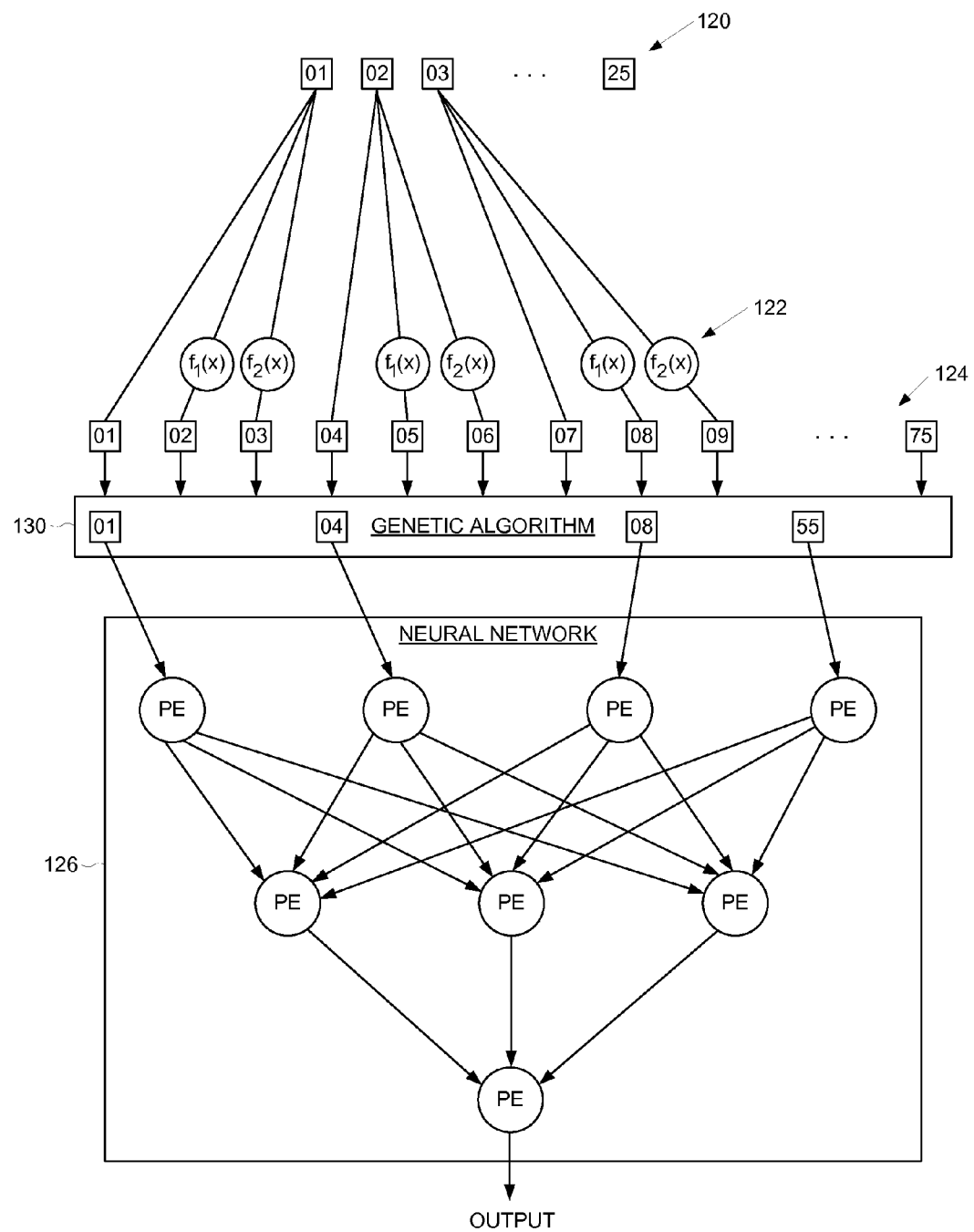
FIG. 9 illustrates the combined aspects of an embodiment of the present invention, including to select a subset of quality metrics using a genetic algorithm for input into a neural network implementing the DFPA.

FIG. 9 shows an overview of the embodiment of the present invention using a genetic algorithm to select the subset of quality metrics that are the best indicators of drive failure. At least one function 122 operates on the primary set of quality metrics 120 to generate a secondary set of quality metrics 124. The secondary set of quality metrics 124 are evaluated by the genetic algorithm 130 to select a subset of the quality metrics that are the best indicators of drive failure. The selected subset of quality metrics are then input into a neural network 126, the output of which is a composite score used to generate the fitness score for the genetic algorithm 130 and to predict drive failure during manufacturing or while in-the-field.

We claim:

1. A method for improving disk drive failure prediction at a central processing facility, the method comprising:
    receiving a set of quality metric values and a failure indicator from one of a plurality of disk drives that are remote to the central processing facility; and
    evolving a disk failure prediction algorithm (DFPA) comprising a neural network to detect an impending failure of at least one of the remote disk drives, the evolving comprising:
        (a) applying a function to a set of primary quality metrics to generate a set of secondary quality metrics;
        (b) using a genetic algorithm to select a subset of the secondary quality metrics;
        (c) applying the quality metric values corresponding to the selected subset of secondary quality metrics to the neural network to generate an output indicative of the fitness of the secondary selected subset of secondary quality metrics to predict drive failure, the applying comprising:
            applying, to the inputs quality metric values, a process element function to generate the output; and
            comparing the output to a reference value based at least in part on the received set of quality metric values and failure indicator; and
        (d) repeating steps (b) and (c) at least once to determine a subset of secondary quality metrics to be used in the DFPA.

2. The method of claim 1, wherein the neural network comprises a process element function that comprises a summation of inputs scaled by a set of weight factors.

3. The method of claim 2, wherein the evolving further comprises:
    determining if a difference between the generated output and a reference value meets a threshold;
    if the difference meets the threshold, saving the selected subset of secondary quality metrics and weight factors; and
    if the difference does not meet the threshold, repeating the step of applying the quality metric values corresponding to the selected subset of secondary quality metrics to the neural network with a different set of weight factors.

4. The method of claim 2, wherein the weight factors are derived from a referenced database.

5. The method of claim 1, wherein the function in step (a) comprises a logarithm base 10 function.

6. The method of claim 1, wherein the function in step (a) comprises a hyperbolic tangent function.

7. The method of claim 1, wherein the quality metrics comprise two or more of: head/disk interface characteristics, read channel settings, error correction parameters, and servo control parameters.

8. An apparatus for improving disk drive failure prediction at a central processing facility, the apparatus comprising:
    a processor configured to execute instructions causing it to:
        receive a set of quality metric values and a failure indicator from one of a plurality of disk drives that are remote to the central processing facility; and
        evolve a disk failure prediction algorithm (DFPA) comprising a neural network to detect an impending failure of at least one of the remote disk drives, the evolving comprising:
            (a) applying a function to a set of primary quality metrics to generate a set of secondary quality metrics;
            (b) using a genetic algorithm to select a subset of the secondary quality metrics as inputs to processing elements of a neural network;
            (c) applying the quality metric values corresponding to the selected subset of secondary quality metrics to the neural network to generate an output indicative of the fitness of the selected subset of secondary quality metrics to predict drive failure, the applying comprising:
                applying, to the quality metric values, a process element function to generate the output; and
                comparing the output to a reference value based at least in part on the received set of quality metric values and failure indicator; and
            (d) repeating steps (b) and (c) at least once to determine a subset of secondary quality metrics to be used in the DFPA.

9. The apparatus of claim 8, wherein the neural network comprises a process element function that comprises a summation of inputs scaled by a set of weight factors.

10. The apparatus of claim 9, wherein the evolving further comprises:
    determining if a difference between the generated output and a reference value meets a threshold;
    if the difference meets the threshold, saving the selected subset of secondary quality metrics and weight factors; and
    if the difference does not meet the threshold, repeating the step of applying the quality metric values corresponding to the selected subset of secondary quality metrics to the neural network with a different set of weight factors.

11. The apparatus of claim 9, wherein the weight factors are derived from a referenced database.

12. The apparatus of claim 8, wherein the function in step (a) comprises a logarithm base 10 function.

13. The apparatus of claim 8, wherein the function in step (a) comprises a hyperbolic tangent function.

14. The apparatus of claim 8, wherein the quality metrics comprise two or more of: head/disk interface characteristics, read channel settings, error correction parameters, and servo control parameters.

* * * * *